Figure 1:
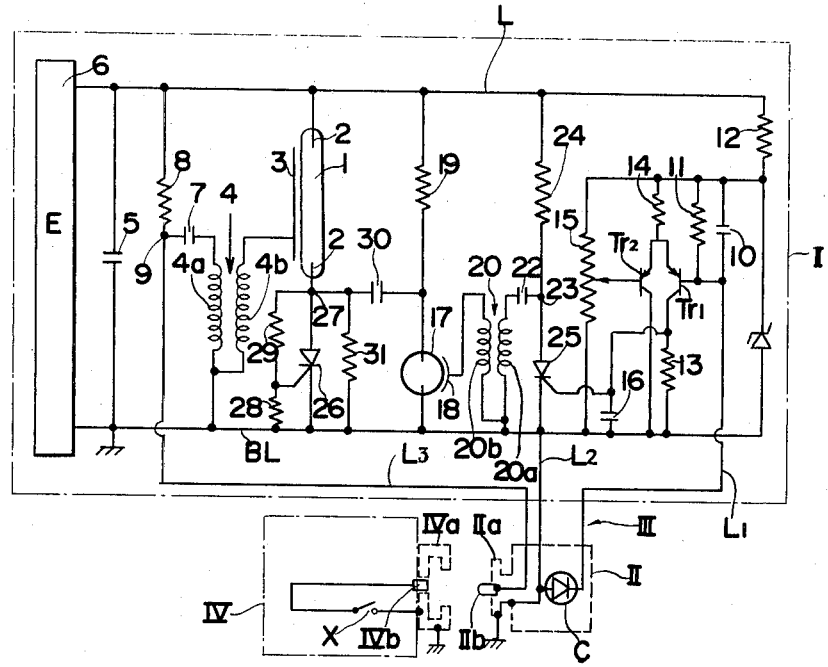

United States Patent [19]
Yata et al.

[11] 3,846,806
[45] Nov. 5, 1974

[54] AUTOMATIC FLASH DEVICE FOR A PHOTOGRAPHIC CAMERA
[75] Inventors: Kotaro Yata; Motonobu Matsuda, both of Osaka, Japan
[73] Assignee: Minolta Camera Kabushiki Kaisha, Osaka, Japan
[22] Filed: Dec. 26, 1973
[21] Appl. No.: 427,858

[30] Foreign Application Priority Data
Dec. 30, 1972 Japan..............................48-126
Feb. 8, 1973 Japan.........................48-16970

[52] U.S. Cl................... 354/31, 354/33, 354/34, 354/145, 354/288
[51] Int. Cl.............................................. G03b 15/05
[58] Field of Search.................. 354/23, 31-35, 354/60, 128, 129, 139, 140, 147, 149, 288

[56] References Cited
UNITED STATES PATENTS
3,418,904 12/1968 Wich et al. ........................... 354/34
3,518,927 7/1970 Mehlitz et al. ......................... 354/30
3,614,918 10/1971 Hennig et al. ......................... 354/35
3,688,659 9/1972 Takishima et al. .............. 354/145 X
3,709,123 1/1973 Tokutomi ........................ 354/32 X
3,769,888 11/1973 Quinn ................................... 354/34
3,776,112 12/1973 Wilwending ..................... 354/34 X Primary Examiner—Joseph F. Peters, Jr.
Attorney, Agent, or Firm—Wenderoth, Lind & Ponack

[57] ABSTRACT

An automatic flash device for use on a photographic camera, which is of a type capable of controlling the flash illumination in response to an incident pulse of reflected light energy originating from the flash illumination. This automatic flash device includes a light sensitive element for sensing the incident pulse of the reflected light energy and then to generate an electrical signal indicative of the amount of the reflected light energy. The light sensitive element is housed in a sensor housing structure separate of a flash housing structure accommodating therein a major portion of the flash circuit.

7 Claims, 3 Drawing Figures

AUTOMATIC FLASH DEVICE FOR A PHOTOGRAPHIC CAMERA

The present invention relates to an automatic flash device for use in association with a photographic still camera, wherein the duration of flash illumination can be controlled in response to an incident pulse of reflacted light energy originating from a flash tube of the flash device.

More particularly, the present invention pertains to an automatic flash device of the type referred to above, wherein a light responsive element for sensing the incident pulse of the reflected light energy is provided separate of the flash housing structure.

A typical conventional automatic flash device of a similar type generally comprises a single housing structure accommodating therein not only a flash circuitry, but also a light responsive element forming a part of the flash circuitry. The housing structure is formed with a large window for a flash tube which provides the flash illumination and a small window for the light responsive element and, therefore, mounting of the flash device onto a photographic camera, either directly or by the use of a connecting bracket, automatically results in that the large and small windows respectively for the flash tube and the light responsive element face in the same direction as the orientation of the photographic camera towards an object to be photographed.

This is particularly disadvantageous when it comes to a bounce lightening technique in which light emitted from the flash tube is bounced off the ceiling or like reflective surface during its travel from the flash unit to the object to be photographed. In other words, when the bounce lightening technique is to be employed during actual taking of a photograph, the photographer is compelled on one hand to rely on a manual procedure, similar to that heretofore practised with a flash device which is not equipped with a control for adjusting the flash illumination, in determining a proper exposure condition in the camera and, on the other hand, to hold the flash device in hand and concurrently to tilt the flash device so as to direct the flash tube towards the ceiling or like reflective surface while an electric circuit associated with the light responsive element is disconnected. This means that the automatic flash device no longer functions automatically.

Accordingly, an essential object of the present invention is to provide an automatic flash device of the type referred to above, which generally comprises a flash housing structure accommodating therein a major portion of an electric circuitry including a flash tube and a sensor housing structure accommodating therein a light responsive element separately of the flash housing structure, but forming a part of the flash circuit, thereby substantially eliminating the above mentioned disadvantage heretofore inherent in the conventional automatic flash device of a similar type.

Another object of the present invention is to provide an automatic flash device of the type referred to above, wherein connection between the flash housing structure and the sensor housing structure is made by the use of a threecored wiring or synchro cord.

A further object of the present invention is to provide an automatic flash device of the type referred to above, which can be utilized selectively in association with bounce lightening technique or like indirect lightening technique and in association with ordinary direct lightening technique.

A still further object of the present invention is to provide an automatic flash device of the type referred to above, which does not require a complicated handling procedure and which provides a variety of choice to potential users of the flash device of the present invention.

Figure 3:
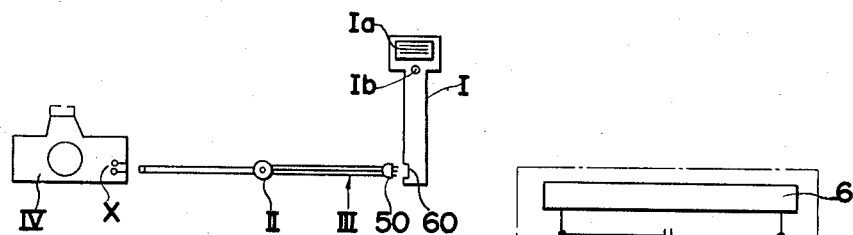
Figure 2:
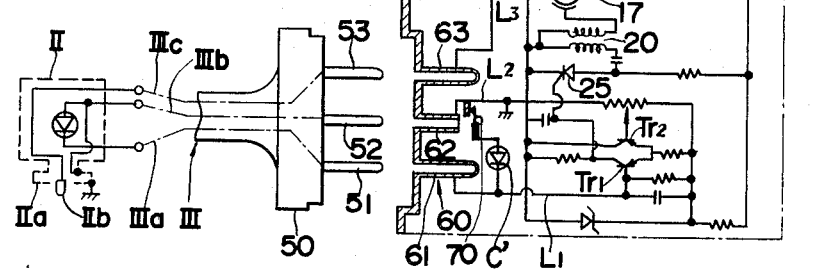

These and other objects and features of the present invention will become apparent from the following description taken in conjunction with preferred embodiments thereof with reference to the accompanying drawings, in which:

FIG. 1 is a circuit diagram showing an electric circuit for an automatic flash device in one embodiment of the present invention, FIG. 2 is a similar diagram to FIG. 1, showing another preferred embodiment of the present invention, and FIG. 3 is a schematic diagram showing one of various possible ways of connection between the flash housing structure and the sensor housing structure.

The automatic flash device constructed in accordance with the teachings of the present invention comprises a flash housing structure I of any suitably shaped configuration, for example, such as shown in FIG. 3, and a photo sensor housing structure II separate of the flash housing structure I, but connected thereto through a three-cored wiring or synchro cord III.

The flash housing structure I accommodates therein an electronic flash circuit which comprises a trigger circuit, a light measuring circuit and a flash extinguishing circuit.

The triggering circuit includes a gas filled flash tube 1 having a pair of main current conducting electrodes 2 respectively connected in parallel to a main storage capacitor 5 which is in turn connected to a high voltage generator 6 of any known construction including a power source (not shown), for example, either a battery power source or alternating current power source, and also having a trigger electrode 3 connected to a trigger transformer 4.

The trigger transformer 4 includes a primary winding 4a having one terminal connected to a bus line BL leading from the high voltage generator 6 and the other terminal connected through a series circuit, consisting of a trigger capacitor 7 and a resistor 8, to the high voltage generator 6 via a line L, and a secondary winding 4b having one terminal connected to the bus line BL and the other terminal connected to the trigger electrode 3 of the flash tube 1.

In the circuit so far described, voltage appearing across the electrodes 2 of the flash tube 1 is discharged upon application of a trigger pulse from the transformer 4 to the trigger electrode 3 which takes place when a common junction as at 9 between the capacitor 7 and the resistor 8 and the bus line BL is shortcircuited to each other. Discharge of the voltage through the flash tube 1, i.e., flash illumination, continues until the capacitor 5 discharges through the flash tube 1 to the point where the voltage will no longer support the flash across the flash tube 1.

In order to make the transformer 4 to generate the trigger pulse therefrom to the trigger electrode 3 of the flash tube 1, a synchro switch X included in a photographic camera IV and operatively associated with a shutter release mechanism of the camera IV in any known manner is adapted to be inserted between the common junction 9 and the bus line BL in a manner as will be described later.

The light measuring circuit for producing an electrical signal required to operate the flash extinguishing circuit includes a photo cell C housed in the photo sensor housing structure II and a switching circuit having a pair of switching transistor Tr1 and Tr2. The photo cell C has a cathode connected to the base of the switching transistor Tr1 through a line $L_1$ and an anode connected to the bus line BL through a line $L_2$. The line $L_1$ is also connected to the line L through a parallel circuit, composed of a capacitor 10 and a discharge resistor 11, and then through a resistor 12.

The emitter of the switching transistor Tr1 is connected to the emitter of the switching transistor Tr2, a common junction of these emitters of the transistors Tr1 and Tr2 being connected to the resistor 12 through a resistor 14. The collector of this transistor Tr1 is connected to the bus line BL through a resistor 13 and also through a capacitor 16 for eliminating noises and that of the transistor Tr2 is connected to the bus line BL. A variable resistor or potentiometer 15 having a movable tap connected to the base of the transistor Tr2 is inserted between the resistor 12 and the bus line BL.

In this light measuring circuit, so long as no current flows through the photo cell C, base-emitter voltage of the transistor Tr1 is lower than that of the transistor Tr2 and, therefore, these transistors Tr1 and Tr2 are respectively held in non-conductive and conductive states.

Positioning of the movable tap of the variable resistor 15 depends on the speed of a film used in the camera IV and determines the level of voltage required for the capacitor 10 to reverse the operating conditions of the transistors Tr1 and Tr2.

Assuming now that the trigger pulse has been applied to the trigger electrode 3 to trigger the flash tube 1 for passing the electrical charge of the main storage capacitor 5 therethrough to illuminate an object to be photographed, some of rays of light emitted from the flash tube 1 are reflected from the object to be photographed onto the photo cell C. The photo cell C, upon receipt of an incident pulse of reflected light energy originating from the flash tube 1, permits current to flow therethrough in proportion to the amount of said reflected light energy, causing the capacitor 10 to undergo charging at a speed in accordance with the intensity of current flowing thereto. Voltage thus stored on the capacitor 10 is applied to the base of the transistor Tr1 and, when the capacitor 10 is charged to the level predetermined by the setting of the movable tap of the variable resistor 15, the transistor Tr1 starts conducting and, simultaneously therewith, the transistor Tr2 becomes non-conductive.

A voltage generated across the resistor 13 during conduction of the transistor Tr1 is fed to the flash extinguishing circuit of an arrangement as will now be described.

The flash extinguishing circuit includes a quench or switch tube 17 having a pair of electrodes respectively connected to the line L through a voltage regulating resistor 19 and to the bus line BL, and also having a trigger electrode 18 connected to a transformer 20. The transformer 20 includes a primary winding 20a having one terminal connected to the bus line BL and the other terminal connected through a capacitor to a common junction 23 between a resistor 24 and a first thyristor 25, and also includes a secondary winding 20b having one terminal connected to the bus line BL and the other terminal connected to the trigger electrode 18 of the quench tube 17. The thyristor 25 has an anode connected to the common junction 23, a cathode connected to the bus line BL and a gate connected to a common junction between the collector of the transistor Tr1 and a capacitor 16.

The flash extinguishing circuit further includes a second thyristor 26 having an anode connected to the flash tube 1 through a junction 27, a cathode connected to the bus line B1 and a gate connected to the bus line BL through a resistor 28 and to the common junction 27 through a resistor 29, and a capacitor 30 having one terminal connected to a common junction between the resistor 19 and the quench tube 17 and the other terminal connected to the common junction 27 and also to the bus line BL through a resistor 31.

It should be noted that the second thyristor 26 is in a conductive state during discharge of the flash tube 1 due to the fact that voltage appearing at the common junction between the resistors 28 and 29 has been applied to the gate of said thyristor 26.

With the above in mind, application of the voltage to the gate of the first thyristor 25 in the manner as hereinbefore described permits the thyristor 25 to start conducting and, consequently, the capacitor 22 is discharged through the thyristor 25 and the discharge current flows through the primary winding 20a of the transformer 20. As the discharge current flows through the primary winding 20a of the transformer 20, voltage is induced through the secondary winding 20b of said transformer 20 which is in turn applied to the trigger electrode 18 of the quench tube so that the latter starts conducting.

On the other hand, prior to the completion of the shortcircuit for the flash tube 1 through the quench tube 17, the capacitor 30 is charged through the resistors 19 and 31 with voltage of a value substantially equal to the power source voltage from the high voltage generator 6. This voltage stored on the capacitor 30 is subsequently discharged through the quench tube 17 at which time the shortcircuit for the flash tube 1 completes.

For enabling the electronic flash circuit of the above construction to operate in such a manner as hereinbefore described, the line $L_2$ and a line $L_3$ leading from the common junction 9 are adapted to shortcircuit to each other upon substantial closure of the synchro switch X in the photographic camera IV.

As an essential feature of the present invention, the photo cell C is housed in position within the housing structure II of the type having a window (not shown), through which the reflected light energy is transmitted to said photo cell C, and a mounting shoe IIa of any known construction. Preferably, the mounting shoe IIa is made of metallic material and serves as an electrode connected with the line $L_2$ while it has a terminal as at IIb electrically insulated from the shoe IIa and connected with the line $L_3$ so far as the camera IV is of the type having a mating accessory shoe IVa provided with a synchro terminal IVb. Electrical connection between the photo cell C and the flash circuit in the housing structure I is made by the use of a three-cored synchro cord III of a suitable length. Alternatively, so far as the camera is of the type having a mating shoe with no synchro terminal, but having a plug-in socket separate of the mating accessory shoe, the housing structure II may have a two-electrode plug instead of the mounting shoe, which is engageable in the plug-in socket, or may have an extension line having one end connected to the flash circuit in the housing structure I and the opposite end provided with a two-electrode plug engageable in the plug-in socket.

Furthermore, as shown in FIG. 2, connection between the flash circuit in the housing structure I and the photo cell C in the housing structure II may be made by the use of a three-pin plug 50 and a mating socket 60 formed in the housing structure I. In this case, the plug 50 must have first to third pins 51, 52 and 53 respectively connected by means of lines IIIa, IIIb and IIIc to the terminal IIb, the anode of the photo cell C and the mounting shoe IIa, and the cathode of the photo cell C, while the socket 60 formed in the housing structure I must have a corresponding number of receiving sleeves 61, 62 and 63 which extend inwards of the housing structure I spaced from each other to align with the associated pins 51, 52 and 53 of the plug 50 and which are respectively connected with the lines $L_1$, $L_2$ and $L_3$.

Preferably, an additional photo cell C' is inserted between the lines $L_1$ and $L_2$ within the housing structure I while a normally closed switch 70 is disposed on a connection between the anode of the additional photo cell C' and the line $L_2$. This switch 70 is operated by the pin 52 of the plug 50, as it is inserted in the corresponding sleeve 62, so as to open the circuit associated with the additional photo cell C' and, on the other hand, to permit the circuit associated with the photo cell C within the housing structure II to be inserted in the flash circuit within the housing structure I.

The embodiment shown in FIG. 2 is particularly advantageous in that, without the photo cell C and its associated wiring including the plug 50, the flash circuit satisfactorily and effectively functions automatically.

As shown in FIG. 3, the housing structure I of FIG. 2 may be shaped to have a large window Ia for the flash tube 1 and a small window Ib for the additional photo cell C'. The socket 60 is preferably formed in the housing structure I at a portion adjacent to the bottom of said housing structure I.

The cord arrangement shown in FIG. 3 for connecting the flash device to the camera through the photo cell C disposed thereon is intended for use in association with a camera outfit or bracket of a construction substantially disclosed in the copending U.S. Pat. application Ser. No. 369,215, filed on June 12, 1973 and assigned to the same assignee.

Although the present invention has been fully described by way of example, it should be noted that various changes and modifications are apparent to those skilled in the art. By way of example, the flash extinguishing circuit shown in FIG. 1 and FIG. 2 may be replaced by the known by-pass circuit which functions for the same purpose and, also, the power source included in the high voltage generator 6 may be made separate of the housing structure I. In addition, instead of the employment of a combined pin plug and socket, such as designated by 50 and 60, any of known connecting instrument can be effectively utilized. For example, a three-electrode plug of substantially cylindrical section and its mating socket may be used. Furthermore, the photo cells C and/or C' may be in the form of a photo diode or a photo transistor, the former being preferred.

Therefore, such changes and modifications should be construed as included within the true scope of the present invention unless otherwise they depart therefrom.

What is claimed is:

1. An automatic flash device for use in association with a photographic camera having a shutter synchronized switch, which comprises:
    a flash housing structure accommodating therein a flash circuit which comprises means including a flash capacitor and a flash tube for selectively artificially illuminating a subject to be photographed through said flash tube upon discharge of voltage stored on said flash capacitor, said discharge of voltage occurring upon closure of said shutter synchronized switch in the photographic camera, a light measuring circuit means responsive to an incident pulse of reflected light energy originating from said flash tube to produce an electrical signal indicative of the amount of said reflected light energy, a triggering circuit means responsive to said electrical signal from said light measuring circuit means to produce a trigger pulse and a switch circuit means responsive to the trigger pulse for terminating the flash illumination; and
    a sensor housing structure having a mounting shoe of substantially inverted T-shape for connection with the camera and accommodating therein a photo cell which forms a part of said light measuring circuit means, said sensor housing structure being separate of said flash housing structure and adapted to be coupled to the camera through said mounting shoe to complete a circuit for said shutter synchronized switch and said photo cell.

2. An automatic flash device as claimed in claim 1, wherein said photo cell is a photo diode.

3. An automatic flash device as claimed in claim 1, wherein electrical connection between said photo cell and said light measuring circuit means in the flash housing structure is made by the use of a three-cored cord.

4. An automatic flash device as claimed in claim 1, further comprising a male coupler electrically connected with the photo cell by means of a three-cored cord leading from the sensor housing structure and a mating female coupler formed in the flash housing structure and electrically connected with the light measuring circuit means.

5. An automatic flash device as claimed in claim 4, wherein said male coupler is a three-pin plug and said female coupler is a socket having receiving sleeves for receiving therein the three pins of said plug for establishing an electrical connection.

6. An automatic flash device as claimed in claim 1, further comprising an additional photo cell forming another part of the light measuring circuit means independent of said photo cell and accommodated within said flash housing structure.

7. An automatic flash device as claimed in claim 6, further comprising a male coupler electrically connected with the photo cell within the sensor housing structure by means of a three-cored cord leading from said sensor housing structure and a mating female coupler formed in the flash housing structure and electrically connected with the light measuring circuit means, said additional photo cell being dis-connected from the circuit when said couplers are engaged to each other to insert the photo cell in the circuit.

* * * * *